US007836396B2

(12) United States Patent
Becker (10) Patent No.: US 7,836,396 B2
(45) Date of Patent: Nov. 16, 2010

(54) AUTOMATICALLY COLLECTING AND COMPRESSING STYLE ATTRIBUTES WITHIN A WEB DOCUMENT

(75) Inventor: Daniel O. Becker, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 986 days.

(21) Appl. No.: 11/620,472

(22) Filed: Jan. 5, 2007

(65) Prior Publication Data
US 2008/0168345 A1    Jul. 10, 2008

(51) Int. Cl.
G06F 17/00    (2006.01)
(52) U.S. Cl. .................................... 715/242
(58) Field of Classification Search ................. 715/242
See application file for complete search history.

(56) References Cited

U.S. PATENT DOCUMENTS

| | | | | |
|---|---|---|---|---|
| 4,814,746 | A * | 3/1989 | Miller et al. | 341/95 |
| 5,946,697 | A * | 8/1999 | Shen | 715/205 |
| 6,330,574 | B1 * | 12/2001 | Murashita | 715/236 |
| 6,480,206 | B2 | 11/2002 | Prinzing | |
| 6,565,609 | B1 | 5/2003 | Sorge et al. | |
| 6,585,778 | B1 | 7/2003 | Hind et al. | |
| 6,635,088 | B1 * | 10/2003 | Hind et al. | 715/236 |
| 6,654,734 | B1 | 11/2003 | Mani et al. | |
| 6,734,871 | B2 | 5/2004 | Weil et al. | |
| 6,750,791 | B1 * | 6/2004 | Liu | 341/87 |
| 6,845,483 | B1 | 1/2005 | Carroll | |
| 6,970,859 | B1 | 11/2005 | Brechner et al. | |
| 7,299,411 | B2 * | 11/2007 | Blair et al. | 715/243 |
| 7,415,665 | B2 * | 8/2008 | Kreiner et al. | 715/242 |
| 7,593,949 | B2 * | 9/2009 | Begun et al. | 707/100 |
| 2001/0042081 | A1 * | 11/2001 | MacFarlane et al. | 707/513 |
| 2002/0010717 | A1 | 1/2002 | Breuer et al. | |
| 2002/0029229 | A1 * | 3/2002 | Jakopac et al. | 707/500 |

(Continued)

FOREIGN PATENT DOCUMENTS

JP    2004126770    4/2004

(Continued)

OTHER PUBLICATIONS

Title: Comparative Analysis of XML Compression Technologies
Author: Wilfred Ng, Lam Sai Yeung, James Cheng, Date: Jan 4, 2006
Url: <www.cs.ust.hk/~wilfred/paper/wwwj05.pdf>.*

(Continued)

*Primary Examiner*—Doug Hutton
*Assistant Examiner*—Mustafa Amin
(74) *Attorney, Agent, or Firm*—David A. Mims, Jr.; Amy J. Pattillo (57) ABSTRACT

A style compressor for improving compression of a web document collects all the style attributes referenced by elements of the web document into a central style repository. The style compressor replaces each reference by each of the elements with a class attribute assigned in the central style repository to the replaced style attributes. Next, the style compressor organizes the style attributes in the central style repository and compresses the style attributes into a minimized selection of class attributes each referencing at least one of the style attributes. The style compressor updates the elements of the web document to reference one or more of the minimized selection of class attributes in the central style repository to produce a shorter, more efficiently organized web document.

20 Claims, 8 Drawing Sheets

U.S. PATENT DOCUMENTS

| | | | |
|---|---|---|---|
| 2002/0065822 A1* | 5/2002 | Itani | 707/7 |
| 2002/0107866 A1* | 8/2002 | Cousins et al. | 707/102 |
| 2002/0107887 A1* | 8/2002 | Cousins | 707/513 |
| 2003/0018466 A1* | 1/2003 | Imaura | 704/6 |
| 2003/0158854 A1* | 8/2003 | Yoshida et al. | 707/101 |
| 2003/0233620 A1 | 12/2003 | Vedullapalli et al. | |
| 2004/0028049 A1* | 2/2004 | Wan | 370/394 |
| 2004/0064588 A1* | 4/2004 | Jungck | 709/247 |
| 2005/0027731 A1* | 2/2005 | Revel | 707/101 |
| 2005/0071758 A1 | 3/2005 | Ehrich et al. | |
| 2005/0102304 A1* | 5/2005 | Yukitomo et al. | 707/101 |
| 2005/0114762 A1* | 5/2005 | Binding et al. | 715/513 |
| 2005/0117886 A1 | 6/2005 | Kang et al. | |
| 2005/0149861 A1 | 7/2005 | Bishop et al. | |
| 2005/0154982 A1 | 7/2005 | Berg | |
| 2005/0160065 A1* | 7/2005 | Seeman | 707/1 |
| 2005/0198395 A1* | 9/2005 | Verma et al. | 709/247 |
| 2006/0085737 A1* | 4/2006 | Liu | 715/513 |
| 2006/0117307 A1* | 6/2006 | Averbuch et al. | 717/143 |
| 2007/0044012 A1* | 2/2007 | Suver et al. | 715/513 |
| 2007/0096953 A1* | 5/2007 | Odagiri | 341/50 |
| 2007/0112810 A1* | 5/2007 | Jonsson | 707/101 |
| 2007/0127440 A1* | 6/2007 | Narayanaswami et al. | 370/352 |
| 2007/0255748 A1* | 11/2007 | Ferragina et al. | 707/102 |
| 2009/0313535 A1* | 12/2009 | Bendelac et al. | 715/208 |

OTHER PUBLICATIONS

XCOMP: An XML Compression Tool Author: Weimin Li Date: 2003 Url: <http://se.uwaterloo.ca/~ddbms/publications/distdb/Weimin.pdf>.*

Title: Lempel-Ziv Compression of Highly Structured Documents, Authors: Joaguin Adiego et al., Date: May 6, 2005, URL:<http://www3.interscience.wiley.com/cgi-bin/fulltext/114097552/PDFSTART>.*

Johnson, J, and Beach, Richard J., "Style in Document Editing Systems", Xerox Corporation, pp. 32-43, 12 pages, copyright 1998 IEEE.

Zhang et al., "Interoperating XML-Style of Digital Artifacts for Information Reuse", Department of Computer Science, University of Texas at Dallas, pp. 126-131, 6 pages, copyright 2005 IEEE.

* cited by examiner

```
<HTML>
<HEAD>
        <TITLE>A Document with Many Styles</TITLE>
</HEAD>
<BODY>    ─504                                                ─506
        <h1 style = "text-align:center; font-style: normal; font-weight: normal; font-size: 12pt;">
        508 Sample one of the styles</h1>
           <P style="background-color: #FFFFFF; text-align: center; text-indent: 0px; line-height: normal;
margin-top: 0px; margin-right: 0px; margin-bottom: 0px; margin-left: 0px; font-style: normal; font-weight:
normal; font-size: 12pt;">                                          ─510
        512   <SPAN style = "font-family: Serif; font-style: normal; font-weight: normal; font-size: 12pt; letter-
spacing: 0.370000pt;">                         ─514
        Additional Styles
        </span>
        </p>
        <h2 style = "text-align:center; font-style: normal; font-weight: normal; font-size: 12pt;">
        Same style as h1</h2>
</BODY>
</HTML>
```

```
<HTML>
<HEAD>
        <TITLE>A Document with Many Styles</TITLE>
        <style type="text/css">                       ─524
        522    .s1 { text-align: center; font-style: normal; font-weight: normal; font-size: 12pt;
               }
               .s2 { background-color: #FFFFFF; text-align: center; text-indent: 0px; line-height:
normal; margin-top: 0px; margin-right: 0px; margin-bottom: 0px; margin-left: 0px; font-style: normal;
font-weight: normal; font-size: 12pt;        ─526
               }
               .s3 { font-family: Serif; font-style: normal; font-weight: normal; font-size: 12pt; letter-
spacing: 0.370000pt;                ─528
               }
</HEAD>
<BODY>
        <h1 class = "s1">─530
        Sample one of the styles</h1>
        <P class = "s2">─532
        <SPAN style = "s3">─534
        Additional Styles
        </span>
        </p>         536
        <h2 class = "s1"> Same style as h1 </h2>
</BODY>
</HTML>
```

AUTOMATICALLY COLLECTING AND COMPRESSING STYLE ATTRIBUTES WITHIN A WEB DOCUMENT

TECHNICAL FIELD

The present invention relates in general to improved web document organization. In particular, the present invention relates to automatically collecting and compressing style attributes within a web document to generate a smaller, more efficiently organized web document.

DESCRIPTION OF THE RELATED ART

In many web documents, such as Extensible Markup Language (XML) documents or Hypertext Markup Language (HTML) documents, there are often many elements and many style attributes assigned to each attribute. Particularly within machine generated versions of web documents, such as server or client generated dynamic web pages, the same style attribute may be assigned multiple times across multiple elements. For example, an element <h1> may include style attributes such as "text-align: center" and "font-style: normal". A different element <h2> in the same web document may include the same style attributes "text-align: center" and "font-style: normal".

As the number of elements and number of redundant style attributes assigned to elements increases in a document, the size of a document increases and the organization of the document is inefficient. A larger, inefficiently organized document requires additional storage at a server, additional bandwidth for download from a server to a client, additional memory for storage at the client, and additional processing at the server and the client.

Therefore, in view of the foregoing, there is a need for a method, system, and program for automatically organizing and reducing the size of web documents.

SUMMARY OF THE INVENTION

Therefore, the invention provides for web document organization. The present invention provides for collecting and compressing style attributes within a web document for a smaller, more efficiently organized web document.

A style compressor for improving compression of style attributes within a web document collects all the style attributes referenced by elements of the web document into a central style repository. The style compressor replaces each reference by each of the elements with a class attribute assigned in the central style repository to the replaced style attributes. Next, the style compressor organizes the style attributes in the central style repository and compresses the style attributes into a minimized selection of class attributes each referencing at least one of the style attributes. The style compressor updates the elements of the web document to reference one or more of the minimized selection of class attributes in the central style repository to produce a shorter, more efficiently organized web document.

In collecting the style attributes into a central style repository, the style collector detects any redundant selection of style attributes referenced by multiple elements and assigns a single class attribute to the redundant selection of style attributes. In addition, in collecting the style attributes into a central style repository, the style collector edits the web document to include a single style element in the head element of the web document for storing the central repository.

Prior to compressing the style attributes in the central style repository, in one embodiment, the style compressor generates a dictionary file including a separate entry for each separate style attribute. The style compressor normalizes the entries in the dictionary file to remove redundant entries, alphabetizes the normalized remaining entries, and assigns a key to each of the normalized remaining entries. Then, the style compressor replaces each of the style attributes in the central style repository with a corresponding key pair in the dictionary file, wherein the central style repository is enabled for compressing the sequences of keys to compress the plurality of style attributes in the central style repository into a minimized selection of class attributes each referencing at least one of the style attributes.

In compressing the central style repository, the style compressor replaces each reference to a particular style attribute within the central style repository with a same key assigned to the particular style attribute. The style compressor adds an entry for each of the keys to an index file. Next, the style compressor scans the central style repository to detect sequential pairs of keys and adds the each sequential pair of keys to the index file. In addition, the style compressor scans the central style repository to detect redundant sequences of keys longer than a sequential pair of keys and adds the redundant sequence of keys to the index file. Then, the style compressor replaces the central style repository with the minimized number of class attributes representing only the compressed selection of entries from the index file required for matching all the keys in the central style repository.

The style compressor collects central style repositories generated for multiple web documents into a single central style repository. From the single central style repository, the style compressor compresses the style attributes into a minimized selection of class attributes each referencing at least one of the style attributes, such that multiple web documents share a same compressed central style repository.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 5 is exemplary code illustrating the result of web language editor editing a web document to generate a central style repository;

DETAILED DESCRIPTION OF THE PREFERRED EMBODIMENT

Figure 1:
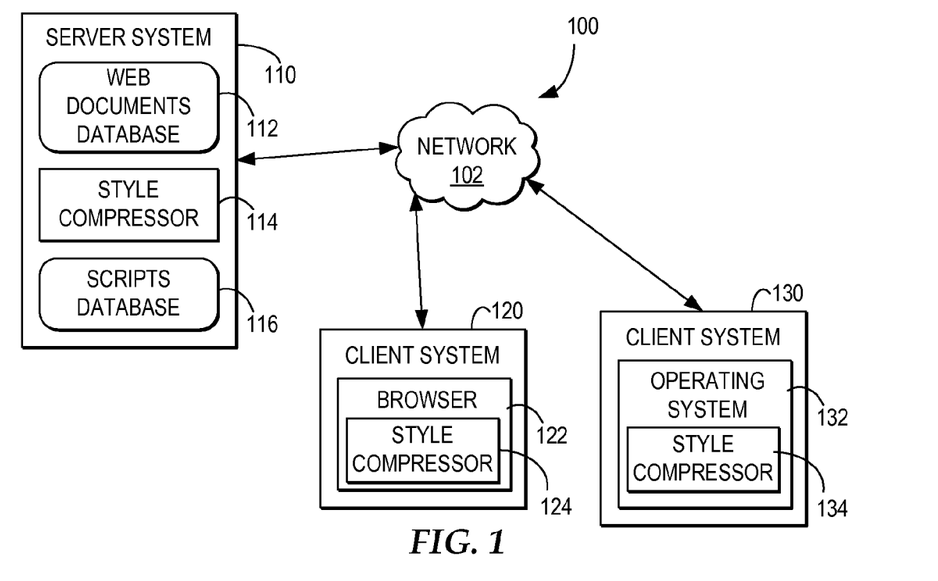
FIG. 1 is a block diagram illustrating one example a network environment for supporting compressed web document storage and downloads in which the present invention may be implemented.

With reference now to FIG. 1, a block diagram illustrates one example a network environment for supporting compressed web document storage and downloads in which the present invention may be implemented. It is important to note that network environment 100 is illustrative of one type of network environment, however, other network environments may support compressed web document storage and downloads. In addition, it is important to note that the distribution of systems within network environment 100 is illustrative of a distribution of systems; however, other distributions of systems within a network environment may be implemented.

As illustrated, multiple systems within network environment 100 may be communicatively connected via network 102, which is the medium used to provide communications links between various devices and computer communicatively connected. Network 102 may include permanent connections such as wire or fiber optics cables and temporary connections made through telephone connections and wireless transmission connections, for example. Network 102 may represent both packet-switching based and telephony based networks, local area and wide area networks, public and private networks. Additionally, network environment 100 supports multiple types and levels of protocols for facilitating storage, transmission, and download of web documents.

Network environment 100 may implement multiple types of network architectures. In one example, network environment 100 may be implemented using a client/server architecture, where computing systems requesting data or processes are referred to as clients and computing systems processing data requests and processes are referred to as servers. In another example, network environment 100 may be implemented in a peer-to-peer network architecture. It will be understood that other types of network architectures and combinations of network architectures may be implemented.

In the embodiment, as illustrated, a server system 110 includes a web documents database 112. Server system 110 may download one or more web documents from web documents database 112 to one or more client systems, such as client system 120 or client system 130, or other systems communicatively connected via network 102. In addition, server system 110 may access a script from script database 116 and generate a dynamic web document for download to one or more client systems via network 102. In particular, it will be understood that server system 110 includes software and hardware elements that enable server system 110 to receive requests for data, access requested data in web documents database 112 and other databases and data storage systems, generate dynamic web documents, and download the web documents and other data to one or more requesting systems. For example, in generating dynamic web documents, server system 110 may run scripts or other programs from script database 116 using a common gateway interface (CGI), where the scripts are based in one or more server-side languages such as Hypertext Preprocessor (PHP), Perl, and JAVA Server Pages (JSP). For example, server system 110 may run middleware such as Websphere (Websphere is a registered trademark of International Business Machines Corporation) software that manages dynamic web page generation.

Each client system, such a client system 120 and client system 130 may include a reader or other application enabled to receive and process web documents. In one example, a browser 120 running on client system 120 receives, processes, and displays web documents as a web page. In addition, web documents downloaded from server system 110 to client system 120 may include client-side scripts or server system 110 may download scripts from scripts database 116 to client system 120. Browser 120, upon detection of script, runs script to generate dynamic web documents. For example, browser 120 may run JAVA Applets or FLASH programs received from server 110 to generate client-side dynamic web documents for rendering within a web page display. It will be understood that other types of readers may be implemented on client system 120 and client system 130 to enable processing and display of types of web documents other than web pages.

According to an advantage of the invention, a style compressor compresses the style attributes in web documents to generate a smaller, more efficiently organized web document. The style compressor may compress the style attributes in a single web document or concurrently in multiple web documents. In addition, as illustrated in the examples of style compressor 114 at server system 110, style compressor 124 at client system 120, and style compressor 134 at client system 130, a style compressor may function within one or more of the software layers of a computer system at one or more systems within network environment 100.

In one illustrative example, a user may upload web documents to web documents database 112. As a user uploads web documents to server system 110, style compressor 114 may automatically compress each web document before storing the web document in web documents database 112. In particular, style compressor 114 may operate as a layer of firmware or other controllers for controlling the interface enabling users to upload web documents to server system 110. In particular, a web site host, including personal web page hosts such as blog hosts, may automatically compress subscriber designed web documents to reduce required storage space, bandwidth, and other resource usage.

In another example, as described, responsive to a request from a client system, server system 110 may generate dynamic web documents from web documents and scripts accessed from web documents database 112 and scripts database 116. Style compressor 114 may automatically compress dynamic web documents before downloading the dynamic web documents to the requesting client system.

In yet another illustrative example, as server system 110 receives requests for selections of web documents from web documents database 112, style compressor 114 may track the number of requests for one or a group of web documents.

Once style compressor 114 detects a threshold number of accesses to a web document or group of web documents, style compressor 114 may automatically trigger compression of the web document or group of web documents. Additionally, style compressor 114 may track other types of statistics about web documents, compare the statistics with thresholds, and trigger compression of web documents when a threshold is reached.

In another illustrative example, a user may request access to a web page via browser 122. Browser 122 requests the web page from server system 110. In one embodiment, accessing the web page requires server system 110 to download one or more of the web documents in web documents database 112 to browser 122. Browser 122 may run scripts included within web documents to generate dynamic web documents. Style compressor 124 may compress web documents upon receipt and may compress dynamic web documents once generated at the client-side. Although style compressor 124 is depicted as a function of browser 122, it will be understood that style compressor 124 may also be a stand-alone application at client system 120.

In yet another illustrative example, client system 130 includes operating system 132 with style compressor 134 as a function of operating system 132. In one example, operating system 132 detects access to web documents at client system 130, whether by a browser or other application, operating system 132 triggers style compressor 134 to compress received web documents and client-side generated dynamic web documents.

The term "web document", as used herein, may refer to documents of one or more document types or file formats, complying with one or more language protocols, which may be transferred over multiple network communication protocols. A web document may consist of an attachment to another document or message. A web page is one type of web document. Therefore, it is important to note that while the examples of web documents illustrated throughout refer to HTML documents and Cascading Style Sheet (CSS) documents, the method, system, and program described throughout may apply to additional or alternate types of web documents.

Figure 2:
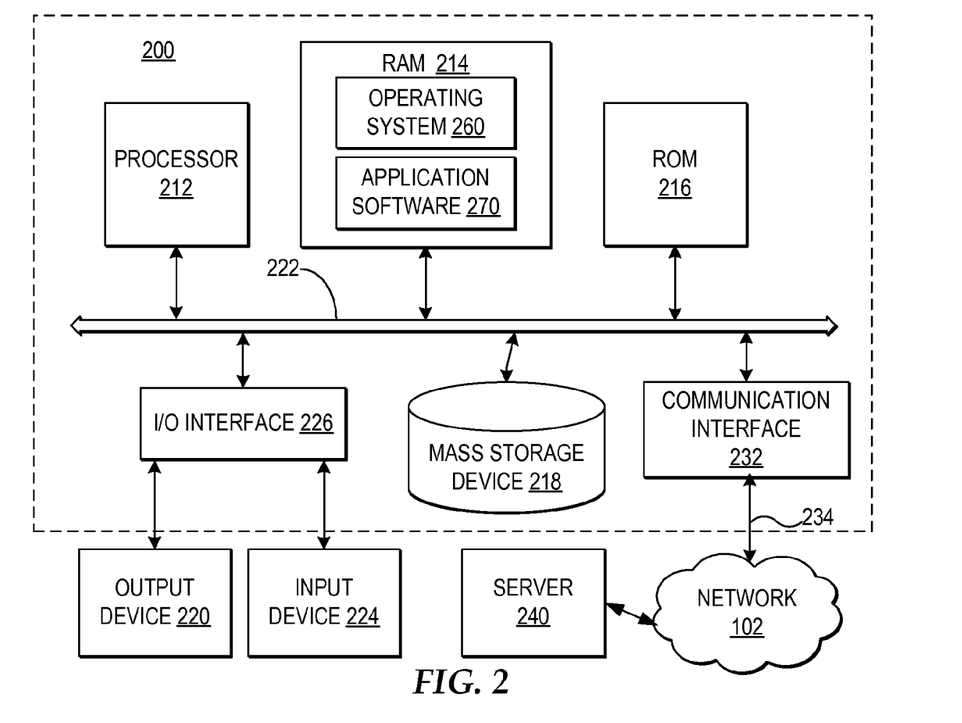
FIG. 2 is a block diagram depicting one embodiment of a computer system in which the present invention may be implemented.

With reference now to FIG. 2, a block diagram illustrates a computer system in which the present invention may be implemented. The controllers and systems of the present invention may be executed in a variety of systems, including a variety of computing systems, such as computer system 200, communicatively connected to a network, such as network 102.

Computer system 200 includes a bus 222 or other communication device for communicating information within computer system 200, and at least one processing device such as processor 212, coupled to bus 222 for processing information. Bus 222 preferably includes low-latency and higher latency paths that are connected by bridges and adapters and controlled within computer system 200 by multiple bus controllers. When implemented as a server, computer system 200 may include multiple processors designed to improve network-servicing power. Where multiple processors share bus 222, an additional controller (not depicted) for managing bus access and locks may be implemented.

Processor 212 may be a general-purpose processor such as IBM's PowerPC™ processor that, during normal operation, processes data under the control of an operating system 260, application software 270, middleware (not depicted), and other code accessible from a dynamic storage device such as random access memory (RAM) 214, a static storage device such as Read Only Memory (ROM) 216, a data storage device, such as mass storage device 218, or other data storage medium.

Figure 12:
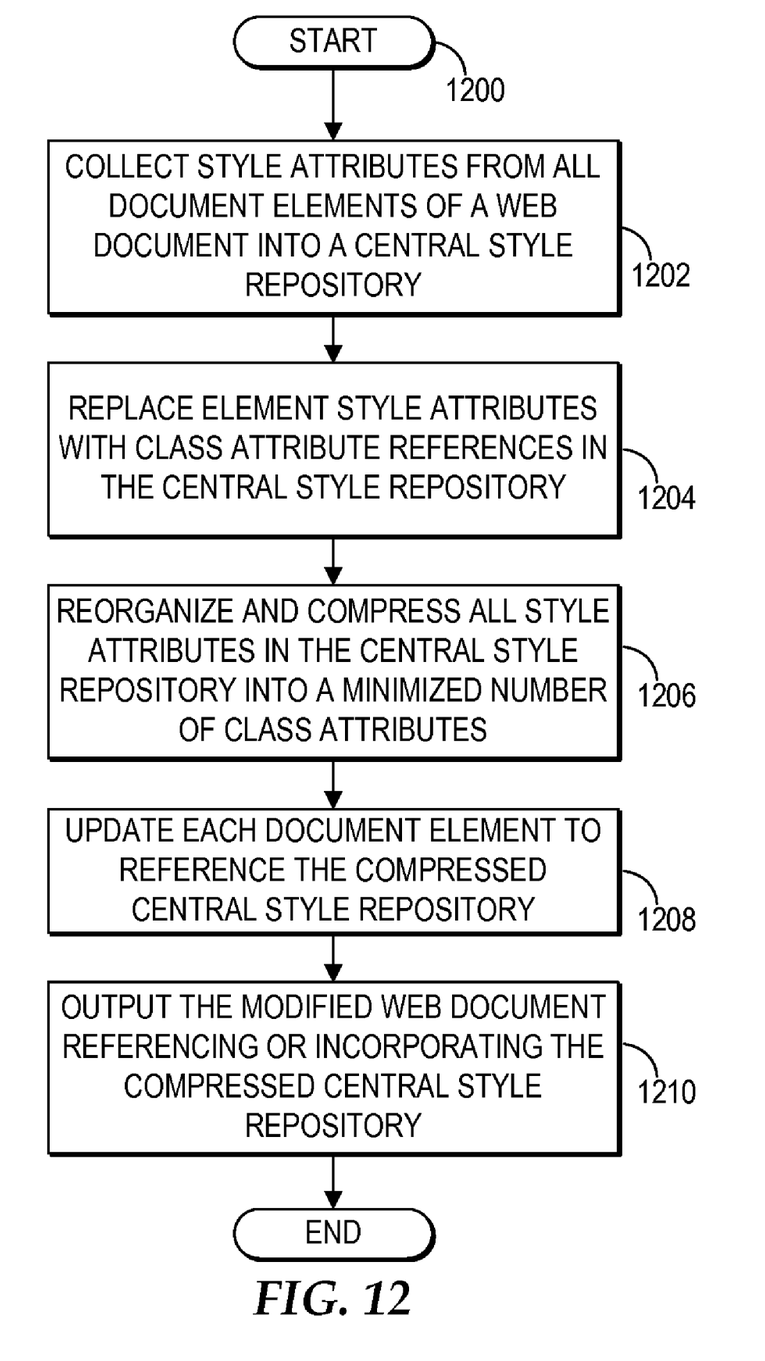
FIG. 12 is a high level logic flowchart illustrating a processing and program for reorganizing and compressing the style attributes in at least one web document.
Figure 13:
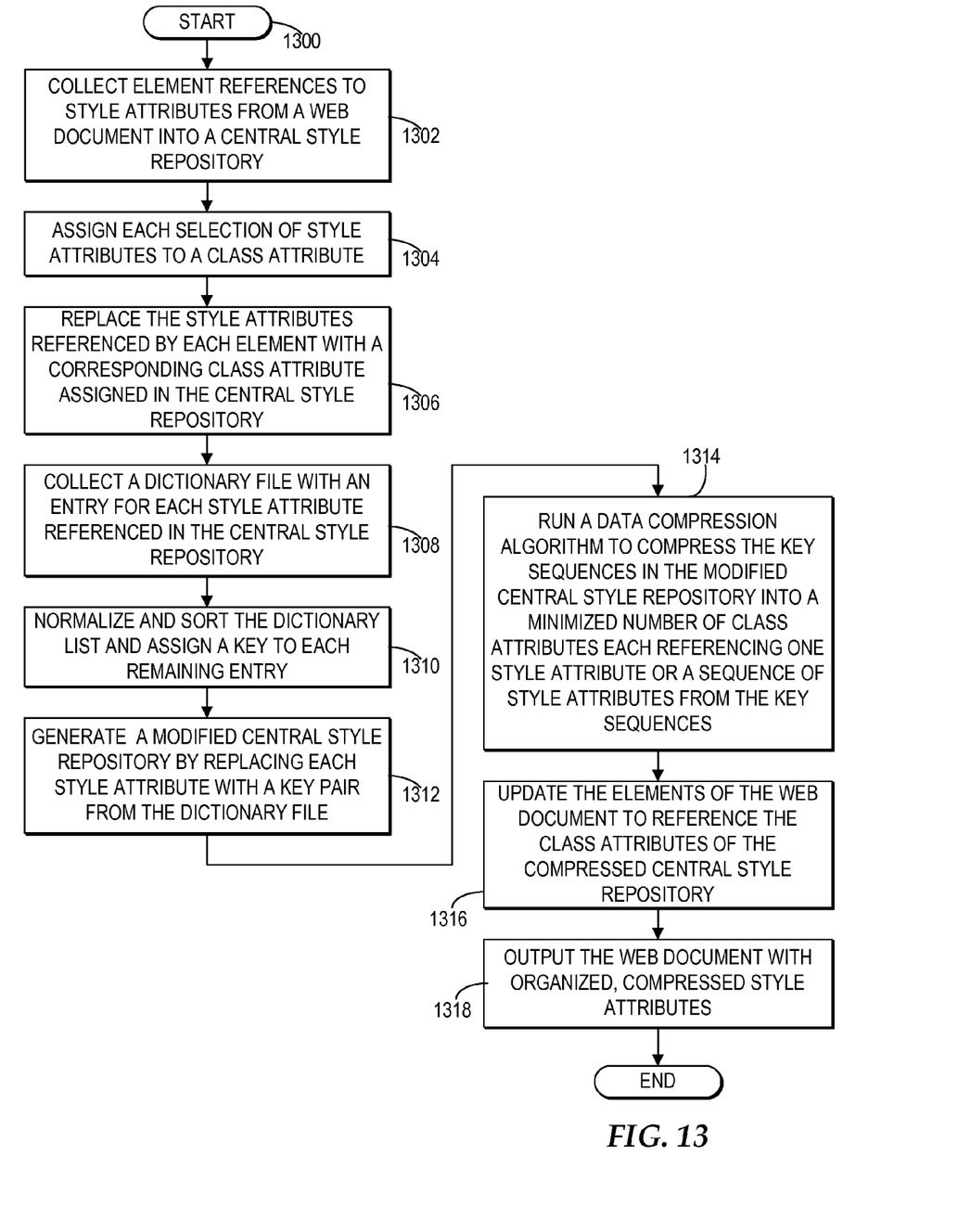
FIG. 13 is a high level logic flowchart illustrating a process and program for performing each of the phases of reorganization and compression of a web document.

In one embodiment, the operations performed by processor 212 may control a style compressor, as depicted in the operations of flowcharts of FIG. 12 and 13 and other operations described herein. Operations performed by processor 212 may be requested by operating system 260, application software 270, middleware or other code or the steps of the present invention might be performed by specific hardware components that contain hardwired logic for performing the steps, or by any combination of programmed computer components and custom hardware components.

The style compressor of the present invention may be provided as a computer program product, included on a computer-readable or machine-readable medium having stored thereon the computer-readable program that when executed on computer system 200 causes computer system 200 to perform a process according to the present invention. The terms "computer-readable medium" or "machine-readable medium" as used herein includes any medium that participates in providing instructions to processor 212 or other components of computer system 200 for execution. Such a medium may take many forms including, but not limited to, storage type media, such as non-volatile media and volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 200 can read and which is suitable for storing instructions. In the present embodiment, an example of a non-volatile medium is mass storage device 218, which as depicted is an internal component of computer system 200, but will be understood to also be provided by an external device. Volatile media include dynamic memory such as RAM 214. Transmission media include coaxial cables, copper wire or fiber optics, including the wires that comprise bus 222. Transmission media can also take the form of acoustic or light waves, such as those generated during radio frequency or infrared data communications.

Moreover, the function management tool of the present invention may be downloaded or distributed as a computer program product, wherein the program instructions may be transmitted from a remote computer such as a server 240 to requesting computer system 200 by way of data signals embodied in a carrier wave or other propagation medium via network 102 to a network link 234 (e.g. a modem or network connection) to a communications interface 232 coupled to bus 222. In one example, where processor 212 includes multiple processor elements is, a processing task distributed among the processor elements, whether locally or via a network, may represent a consumer program product, where the processing task includes program instructions for performing a process or program instructions for accessing JAVA (JAVA is a registered trademark of Sun Microsystems, Inc.) objects or other executables for performing a process. Communications interface 232 provides a two-way data communications coupling to network link 234 that may be connected, for example, to a local area network (LAN), wide area network (WAN), or directly to an Internet Service Provider (ISP). In particular, network link 234 may provide wired and/or wireless network communications to one or more networks, such as network 102. Further, although not depicted, communication interface 232 may include software, such as device drivers, hardware, such as adapters, and other controllers that enable communication. When implemented as a server, computer system 200 may include multiple communication interfaces accessible via multiple peripheral component interconnect (PCI) bus bridges connected to an input/output controller, for example. In this manner, computer system 200 allows connections to multiple clients via multiple separate ports and each port may also support multiple connections to multiple clients.

Network link 234 and network 102 both use electrical, electromagnetic, or optical signals that carry digital data streams. The signals through the various networks and the signals on network link 234 and through communication interface 232, which carry the digital data to and from computer system 500, may be forms of carrier waves transporting the information.

In addition, computer system 200 may include multiple peripheral components that facilitate input and output. These peripheral components are connected to multiple controllers, adapters, and expansion slots, such as input/output (I/O) interface 226, coupled to one of the multiple levels of bus 222. For example, input device 224 may include, for example, a microphone, a video capture device, a card reader, a body scanning system, a keyboard, a mouse, or other input peripheral device, communicatively enabled on bus 222 via I/O interface 226 controlling inputs. In addition, for example, an output device 220 communicatively enabled on bus 222 via I/O interface 226 for controlling outputs may include, for example, one or more graphical display devices, audio speakers, and tactile detectable output interfaces, but may also include other output interfaces. In alternate embodiments of the present invention, additional or alternate input and output peripheral components may be added.

Those of ordinary skill in the art will appreciate that the hardware depicted in FIG. 2 may vary. Furthermore, those of ordinary skill in the art will appreciate that the depicted example is not meant to imply architectural limitations with respect to the present invention.

Figure 3:
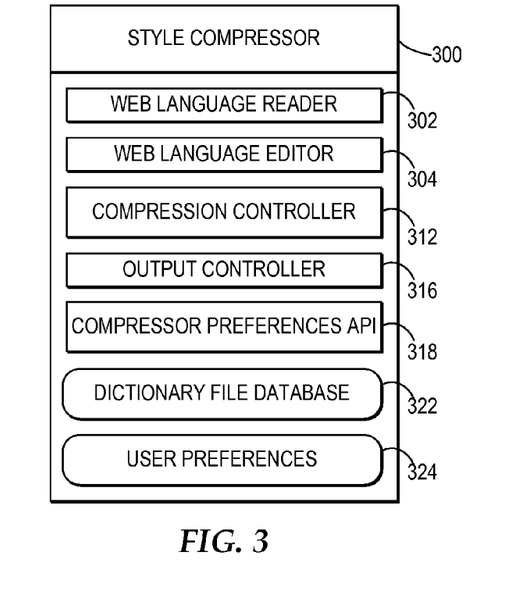
FIG. 3 is a block diagram illustrating one embodiment of components of a style compressor.

With reference now to FIG. 3, a block diagram illustrates components of a style compressor. It will be understood that style compressor 300 may include additional or alternate components in additional embodiments.

In the example, style compressor 300 includes a web language reader 302 and a web language editor 304. Web language reader 302 reads documents implementing multiple web languages. For example, web language reader 302 may read documents including elements in HTML and CSS. Web language editor 304 may edit or generate web documents implementing multiple web languages. For example, web language editor 304 may automatically edit or generate HTML or CSS within a web document or in a new web document.

For purposes of compressing web documents, web language reader 302 scans a web document to identify each list of one or more style attributes referenced by one or more elements within the web document. Web language editor 302 collects the identified lists of style attributes and generates a central style repository of the identified style attributes. In one example, the central style repository is placed in a document separate from the scanned web document. In another example, within a scanned HTML document or XML document, the central style repository may be placed in the head element of the scanned web document as a single style element.

Next, web language editor 304 assigns each list of style attributes within the central style repository to a class identifier. Web language editor 304 replaces each list of style attributes referenced by an element with the class identifier referring to the list of style attributes in the central style repository. Thus, each element within a web document that previously referred to a style attribute is edited to refer to a class attribute.

In addition, style compressor 300 includes a compression controller 312. Compression controller 312 reorganizes the lists of style attributes within the central style repository into sequences of keys for optimum compression. If style attributes are removed or reorganized during reorganization and compression, then compression controller 312 updates the class attributes referred to by the elements within the document to reflect the class attributes in the compressed and reorganized central style repository. In particular, in the embodiment, compression controller 312 is described as applying a Lempel-Ziv algorithm to compress sequences of keys representing style attributes in the central style repository into a minimized number of class attributes. In other embodiments, compression controller 312 may apply other compression algorithms to minimize the number of class attributes required to reference the sequences of style attributes.

Style compressor 300 includes an output controller 316 for controlling how the central style repository for the updated web document is output. In one example, the central style repository is placed in the head of a web document. In another example, the central style repository generated from a web document is placed in a separate CSS document and the web document is edited to include a reference to the CSS document.

Additionally, style compressor 300 includes a compressor preferences application programming interface (API) 318. Through compressor preferences API 318, a user may select preferences for running style compressor 300. Compressor preferences API 318 may store selections of user preferences in a user preferences file 324. In particular, as will be further described, compression controller 312 produces a dictionary file while compressing a web document and a user may select, through compressor preferences API 318, to store dictionary files in a dictionary file database 322 or reuse dictionary files from dictionary file database 322 when compressing a web document.

Figure 4:
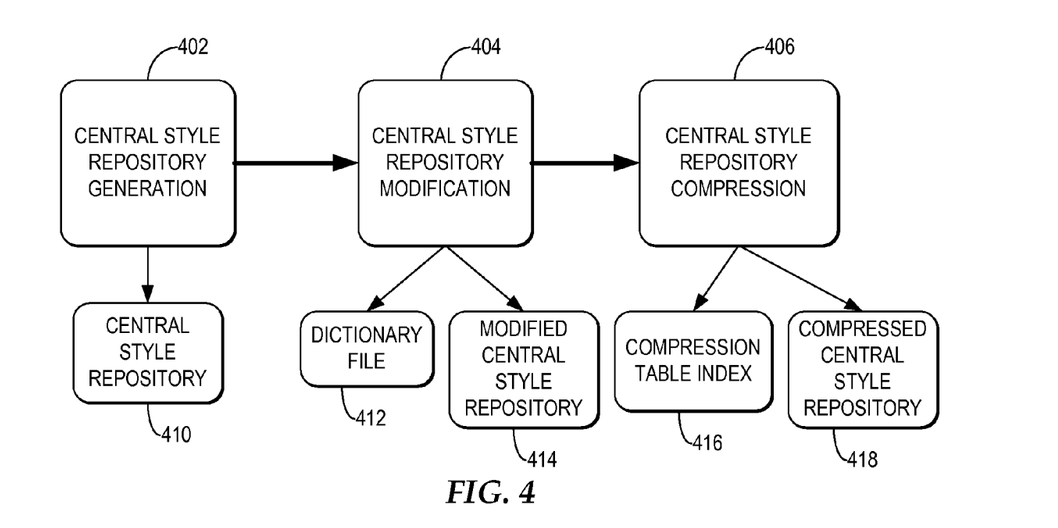
FIG. 4 is a block diagram depicting the multiple reorganization and compression phases performed by the style compressor.

Referring now to FIG. 4, a block diagram illustrates the multiple reorganization and compression phases performed by the style compressor. As will be further described in detail in the examples depicted in FIG. 5-FIG. 9, style compressor 300 performs multiple stages of reorganization and compression of a web document. While the combination of stages produces more efficient reorganization and compression, in other embodiments, one or more of the stages may be performed by style compressor 300 to generate a reorganized and compressed web document.

In the example, in a central style repository generation stage 402, web language reader 302 and web language editor 304 scan and edit a document to generate a central style repository 410 of class attributes each assigned a non-redundant list of one or more style attributes and to replace each element within the web document referencing a list of style attributes with a reference to the associated class attribute. In generating central style repository 410, web language editor 304 may alphabetize style attributes for more efficient identification of redundant lists of style attributes.

During central style repository generation stage 402, organizing the lists of style attributes within a web document under class attributes improves the organization of the web document. In addition, during central style repository generation stage 402, removing any redundant lists of style attributes provides a first level of compression of the web document.

In a central style repository modification stage 404, compression controller 312 generates a separate dictionary file 412 of each separate style attribute in a web document and normalizes the style attributes in dictionary file 412 to remove redundant copies of a same single style attribute. In addition, compression controller 312 orders the style attributes in dictionary file 412, such as by alphabetizing the entries, and assigns each entry a key, such as an alphanumeric letter. Next, compression controller 312 replaces each reference to a style attribute in central style repository 410 with the key paired to the style attribute in dictionary file 412, to generate modified central style repository 414.

In one embodiment, central style repository modification stage 404 reorganizes and compresses the web document in a manner that enables compression controller 312 to most efficiently run a compression algorithm to further compress the references to style attributes. In particular, central style repository modification stage 404 reorganizes and compresses the web document to generate sequences of keys within modified central style repository 414 upon which compression controller 312 can run the Lempel-Ziv algorithm or other key compression algorithm. In other embodiments, compression controller 312 may reorganize style attributes into other formats most efficient for a type of data compression algorithm to be applied.

In another embodiment, however, dictionary file 412 may be generated into a new web document associated with a single or multiple web documents. By reorganizing style attribute references in a web document to refer to a key pair in a dictionary file web document, particularly when compression controller 312 compresses multiple web documents simultaneously, the coding size of each web document is reduced by replacing multiple references to a same style attribute with a single key.

In yet another embodiment, following central style repository modification stage 404, compression controller 312 may store a web document with modified central style repository 414 and complete the compression of the web document based on a shared dictionary file at a point in the future. For example, compression controller 312 may continue to reuse and update dictionary file 412 across multiple web documents and only complete the final stage of compression once a web document is requested or once all web documents in a grouping of web documents have been modified.

Finally, in a central style repository compression stage 406, compression controller 312 runs a compression algorithm on the sequences of keys paired to style attributes in modified central style repository 414 and generates compression table index 416. In one example, compression controller 312 runs the Lempel-Ziv algorithm which scans the sequences of keys in modified central style repository 414, adding sequences of keys to compression table index 416, and identifying longer redundant key sequences. Based on the key sequences recorded in compression table index 416, compression controller 312 replaces modified central style repository 414 with a minimized number of class attributes each referencing applicable sequences of style attributes from compression table index 416. Next, compression controller 312 updates the elements of the web document to refer to the class attributes in compressed central style repository 418.

In one example, in running the Lempel-Ziv algorithm, compression controller 312 first initializes compression table index 416 with all single character strings, or each key. Next, as compression controller 312 scans the sequences of keys in modified central style repository 414, compression controller 312 stores each two-character string, or pair of keys, in compression table index 416. Next, whenever compression controller 312 reads a previously-encountered, already stored character string, then the code for the string concatenated with the next character in the sequence is stored in the table. By running the Lempel-Ziv algorithm, compression controller 312 efficiently determines the minimum number of entries required to represent the sequences of keys in modified central style repository 414. It will be understood that compression controller 312 may perform additional or alternate steps in applying the Lempel-Ziv algorithm or other data compression algorithm to compress modified central style repository 414.

With now to FIG. 5, exemplary code illustrates the result of web language editor editing a web document to generate a central style repository. In the example, code 502 is illustrative of an HTML web document with multiple elements. In particular, in code 502 within the body element, types of elements include a heading h1 at reference numeral 504, a paragraph P at reference numeral 508, a paragraph SPAN at reference numeral 512, and a heading h2 at reference numeral 516. It will be understood that while the web document illustrated shows examples of the element types of heading and paragraph, a web document may include additional or alternate types of elements, such as a list element, and may include multiple instances of each type of element.

Each element within code 502 refers to a style attribute. For example, element hi at reference numeral 504 refers to multiple style attributes illustrated at reference numeral 506, element P illustrated at reference numeral 508 refers to multiple style attributes illustrated at reference numeral 510, element SPAN illustrated at reference numeral 512 refers to multiple style attributes illustrated at reference numeral 514, and element h2 at reference numeral 516 refers to multiple style attributes illustrated at reference numeral 518. In particular, in the example "text-align: center" is one style attribute within the list of style attributes illustrated at reference numeral 506. In addition, in the example, the style attributes are described by the CSS specifications and describe properties such as color, font, alignment, and spacing. It will be understood that in other embodiments, other style specifications may describe the style attributes and that style attributes may describe additional properties.

Web language reader 302 reads code 502 and identifies each of the style attributes illustrated at reference numerals 506, 510, 514, and 518. Web language editor 304 edits code 502 to generate code 522, where code 522 includes a central style repository 522 as a single style element of the head element of the web document identified as <style type="text/css">. In the example, central style repository 522 includes each of the style attributes illustrated at reference numerals 506, 510, 514, and 518, however, each of the sets of style attributes are assigned to a separate class attribute in central style repository 522. In the example, web language editor 304 assigns the style attributes illustrated at reference numeral 506 to a class attribute "s1" as illustrated at reference numeral 524, the style attributes illustrated at reference numeral 510 to a class attribute "s2" as illustrated at reference numeral 526, and the style attributes illustrated at reference numeral 514 to a class attribute "s3" as illustrated at reference numeral 528.

In addition, web language editor 304 edits the elements within code 302 to replace the style attribute references within the body element to class attribute references correlating with the class attribute assignments in central style repository 522. For example, web language editor 304 replaces the style attributes illustrated at reference numeral 506 with the class attribute "s1" as illustrated at reference numeral 530, the style attributes illustrated at reference numeral 510 with the class attribute "s2" as illustrated at reference numeral 532, and the style attributes illustrated at reference numeral 514 with the class attribute "s3" as illustrated at reference numeral 534.

The set of style attributes illustrated at reference numeral 518 is the same as the set of style attributes illustrated at reference numeral 506. As web language editor 304 adds sets of style attributes assigned to class attributes within central style repository 522, web language editor 304 detects redundant sets of style attributes, such as the style attributes illustrated at reference numeral 518, and does not generate an additional class attribute for the redundant set of style attributes. In addition, as web language editor 304 replaces the style attribute illustrated at reference numeral 518 with a class attribute, web language editor 304 replaces the style attribute with class attribute "s1" as illustrated at reference numeral 536. Therefore, in a web document with multiple repeated sets of style elements, by replacing redundant lists of style attributes with a same class attribute, web language editor 304 reorganizes and compresses the code in the web document.

Figure 6:
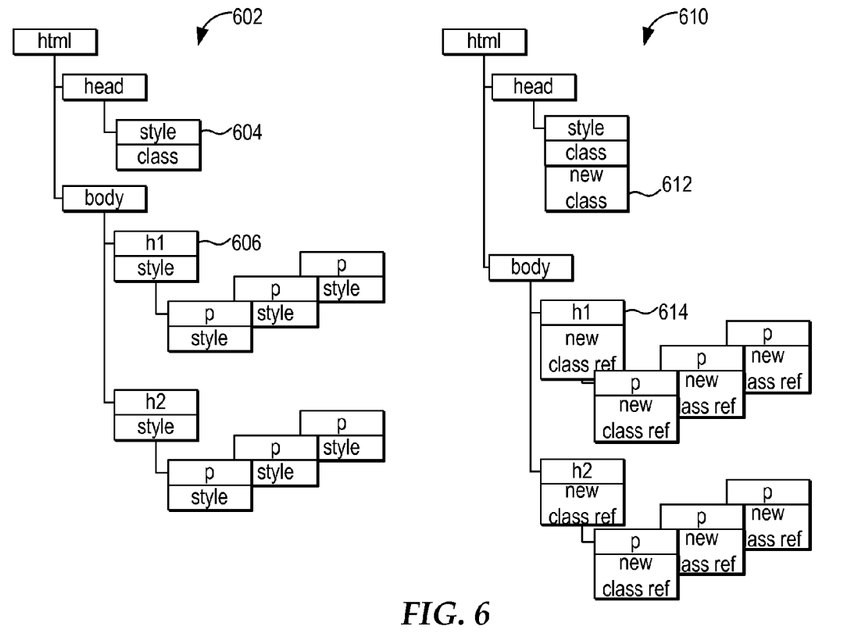
FIG. 6 is a block diagram depicting a document object model (DOM) of the nodes of a web document after the web language editor replaces references by elements to style attributes with references to class attributes.

Referring now to FIG. 6, a block diagram illustrates a document object model (DOM) of the nodes of a web document after the web language editor replaces references by elements to style attributes with references to class attributes.

First, as illustrated at reference numeral 602, a DOM representation of an HTML document includes a head element and a body element. Under the head element, as illustrated at reference numeral 604, a single style element is defined with one or more class attributes, however, under the body element, each of the header and paragraph elements reference style attributes. For example, the h1 element illustrated at reference numeral 606 is illustrative of a header element referencing a style attribute. In an alternate embodiment, one or more of the body elements may reference one or more of the class attributes of the style element illustrated at reference numeral 604. In addition, in an alternate embodiment, a DOM may not initially include a style element under the head element.

As a result of style compressor 300 compressing the web document represented by the DOM illustrated at reference numeral 602, under the head element, web language editor 304 builds the central style repository under the single style element, by creating classes of style attributes composed of the style attributes referenced by the elements of the body element. In particular, web language editor 304 adds one or more new class attributes to the style element and assigns the selections of style attributes referenced by the elements of the body element to the new class attributes, as illustrated at reference numeral 612. Because the style attributes are moved under class attributes of the single style element, under the body element, web language editor 314 replaces the style attributes previously assigned to each element under the body element with a reference to the corresponding new class attribute to which the style attributes are assigned. For example, the h1 element illustrated at reference numeral 614 is illustrative of a header element under the body element updated to reference one of the new class attributes.

Figure 7:
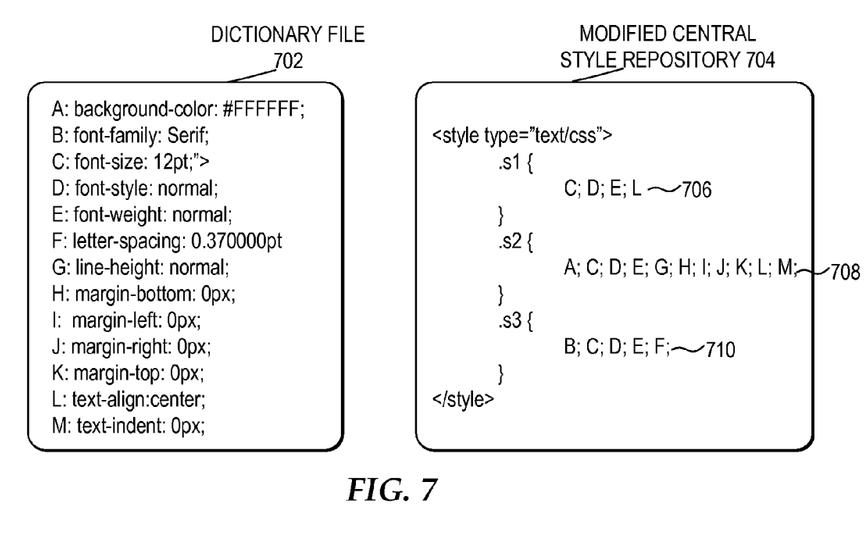
FIG. 7 is exemplary code illustrating a dictionary file and a central style repository when sorted by the compression controller.

With reference now to FIG. 7, exemplary code illustrates a dictionary file and a central style repository when sorted by the compression controller. As previously described, once web language editor 304 generates a central style repository 522, compression controller 312 performs a next reorganization and compression phase by generating a dictionary file with a separate entry for each style attribute reference in a central style repository and replacing the style attributes within the central style repository with the references in the dictionary file.

In the illustrated example, a dictionary file 702 includes the sorted style attributes from central style repository 522 each assigned to a key or other value. In the example, each style attribute is assigned to a single alphanumeric key. It will be understood compression controller 312 may assign additional or alternate types of keys or other values the style attributes.

In particular, in generating dictionary file 702, compression controller 312 normalizes the style attributes to remove redundant style attributes. For example, in central style repository 522, class attribute "s1" and class attribute "s2" include a same style attribute "text-align: center", therefore in normalizing the style attributes from central style repository 522, compression controller 312 only includes a single reference to the style attribute "text-align: center" in dictionary file 702.

In addition to normalizing the style attributes within dictionary file 702, compression controller 312 may perform additional ordering of the remaining style attributes for improving organization of the document. For example, compression controller 312 may alphabetize the remaining style attributes as illustrated within dictionary file 702.

Once compression controller 312 generates dictionary file 702, compression controller 312 updates central style repository 522 to reflect the key paired with each style attribute, as illustrated by modified central style repository 704. For example, compression controller 312 replaces the style attributes illustrated at reference numeral 524 with the corresponding key pairs as illustrated at reference numeral 706, the style attributes illustrated at reference numeral 526 with the corresponding key pairs as illustrated at reference numeral 708, and the style attributes illustrated at reference numeral 528 with the corresponding key pairs as illustrated at reference numeral 710.

By replacing class elements within the central style repository with the key pairs to the style attributes, the style attributes are efficiently organized for the application of one or more compression algorithms. For example, with reference now to FIG. 8, a compression table index 800 includes the results of compression controller 312 running the Lempel-Ziv algorithm on the entries in dictionary file 702 and the ordered keys in modified central style repository 704.

Figure 8:
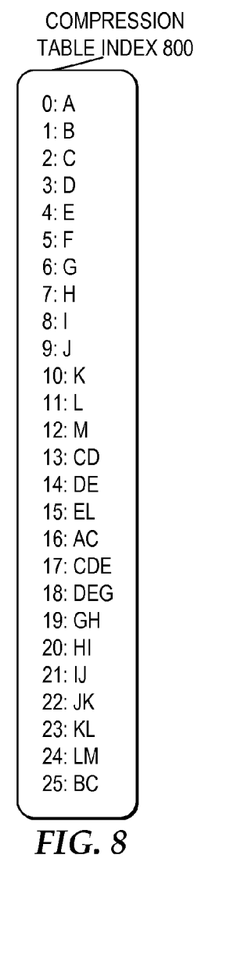
FIG. 8 is a compression table index illustrating example results of the compression controller running the Lempel-Ziv algorithm.

In the example, in running the Lempel-Ziv algorithm, compression controller 312 includes a separate entry in compression table index 800 for each of the original dictionary entries in dictionary file 702, as illustrated in entries 0-12 in compression table index 800. Next, compression controller 312 scans the sequences of keys in modified central style repository 704 and adds progressively longer sequences of keys to the compression table as compression controller 312 detects redundancies in sequences of keys. Compression controller 312 may perform one or more passes of the ordered keys in modified central style repository 704 and the compression table index entries in applying the Lempel-Ziv algorithm. Thus, it will be understood that the entries illustrated in compression table index 800 are illustrative of entries that may be generated in compression table index 800, however, additional or alternate entries may be entered.

For example, the key pairs illustrated at reference numeral 706 and the key pairs illustrated at reference numeral 708 both include a sequence of "CDE". As compression controller 312 scans the sequence of key pairs illustrated at reference numeral 706, compression controller 312 adds entry "13:CD" and entry "14:DE". However, as compression controller 312 reaches the sequence of key pairs illustrated at reference numeral 708, compression controller 312 detects there is already entry "13:CD" and adds a longer sequence of entry "17:CDE".

Figure 9:
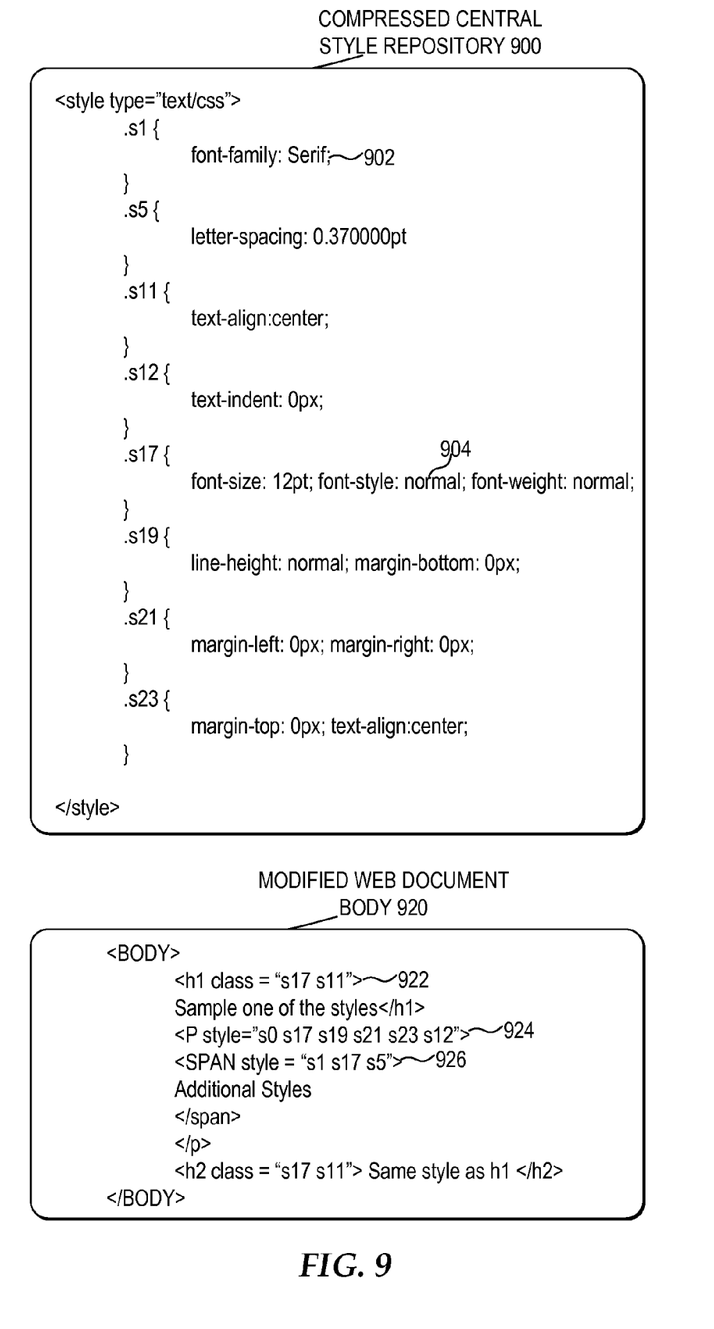
FIG. 9 is exemplary code depicting the central style repository and elements of a compressed web document.

With reference now to FIG. 9, exemplary code illustrates the central style repository and elements of a compressed web document. In the example, once compression controller 312 completes compression of compression table index 800, then compression controller 312 replaces modified central style repository 704 with the entries in compression table index 800 as indexed into dictionary 702.

In the example, compression controller 312 replaces modified central style repository 704 with compressed central style repository 900. Compressed central style repository 900 includes class attributes numbered to correspond with applicable entries from compression table index 800 and referencing corresponding style attributes from dictionary file 702.

In one example illustrated at reference numeral 902, the class attribute "s1" in modified central style repository 704 is replaced with the a class attribute with the same name "s1", but referencing the style attribute assigned to the letter "B" assigned to the "1" index entry within compression table index 800. The style attribute assigned to the letter "B" represents the style attribute "font-family:serif" in dictionary file 702. Therefore, as illustrated at reference numeral 902, the class attribute "s1", in compressed central style repository 900, refers to style attribute "font-family:serif".

In another example illustrated at reference numeral 904, modified central style repository 704 is replaced with a class attribute "s17" corresponding to index entry "17" within compression table index 800. Index entry "17" is indexed to "CDE". The style attributes associated with "CDE" from dictionary file 702 are "font-size: 12 pt", "font-style: normal", and "font-weight: normal". Therefore, as illustrated at reference numeral 904, the class attribute "s17", in compressed central style repository 900, refers to style attributes "font-size: 12 pt; font-style: normal; font-weight: normal".

Once compression controller 312 replaces modified central style repository 704 with compressed style repository 900, compression controller 312 then updates the styles in the document elements with the class attributes in compressed style repository 900 as illustrated within the elements of modified web document body 920.

For example, header hi previously referred to class attribute "s1", as illustrated at reference numeral 530. Class attribute "s1" referenced the style attributes assigned to letters "CDEL" in modified central style repository 704. To update the class attribute of header h1, as illustrated at reference numeral 922, compression controller 312 edits header h1 to reference class attribute "s17", which references the style attributes assigned to letters "CDE", and to reference class "s11", which references the style attribute assigned to letter "L.

In another example, paragraph P previously referred to class attribute "s2", as illustrated at reference numeral 532. Class attribute "s2" referenced the style attributes assigned to letters "ACDEGHIJKLM". To update the class attribute referenced by paragraph P, as illustrated at reference numeral 924, compression controller 312 edits paragraph P to reference class attribute "s0", which references the style attribute assigned to letter "A", to reference class attribute "s17", which references the style attributes assigned to letters "CDE", to reference class attribute "s19", which references the style attributes assigned to letters "GH", to reference class attribute "s21", which references the style attributes assigned to letters "IJ", to reference class attribute "s23", which references the style attributes assigned to letters "KL", and to reference class attribute "s12", which references the style attribute assigned to letter "M".

In yet another example, paragraph SPAN previously referred to class attribute "s3", as illustrated at reference numeral 534. Class attribute "s3" referenced the style attributes assigned to letters "BCDEF". To update the class attribute referenced by paragraph SPAN, as illustrated at reference numeral 926, compression controller 312 edits paragraph SPAN to reference class attribute "s1", which references the style attribute assigned to letter "B", to reference class attribute "s17", which references the style attributes assigned to letters "CDE", and to reference class attribute "s5", which references the style attribute assigned to letter "F".

Figure 10:
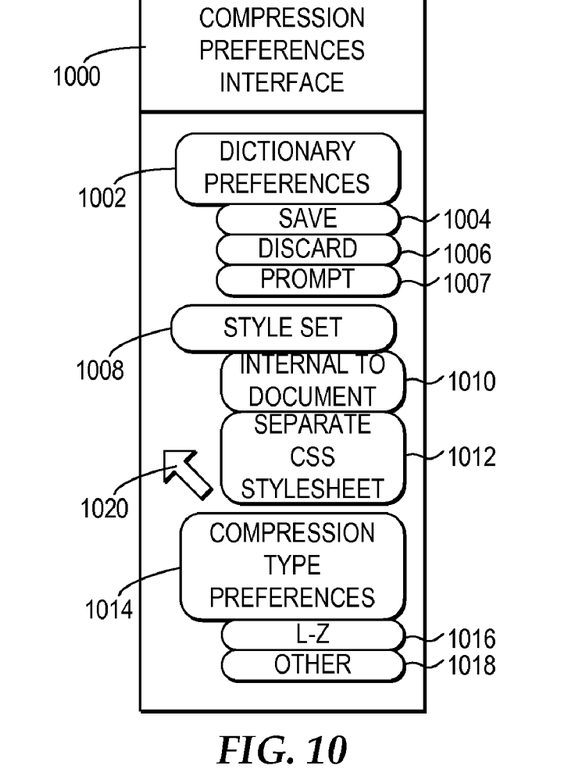
FIG. 10 is a block diagram illustrating an example interface through which a user may select style compressor preferences.

Referring now to FIG. 10, a block diagram illustrates an example interface through which a user may select style compressor preferences. In the example, compressor preferences API 318 enables compression preferences interface 1000 through which a user may select preferences using inputs associated with placement of cursor 1020. A user may select preferences through compression preferences interface 1000 for a particular web document compression, a group of web document compressions, or web document compressions in general. Currently selected user preferences are stored in user preferences database 324.

Compression preferences interface 1000 includes a first preferences selection of dictionary preferences 1002. Under dictionary preferences 1002, a user may select an option of save 1004, discard 1006, or prompt 1007. By selecting to save dictionaries, dictionary files generated by compression controller 312 are stored in dictionary database 322. By selecting to discard dictionaries, dictionary files generated by compression controller 312 are discarded after the compression of a web document is completed. By selecting to prompt, compressor preferences API 318 triggers a prompt to a user once a dictionary file is generated to select whether to save the dictionary file from the compression. Dictionary files stored in dictionary database 322 may be reused when compressing future web documents. In particular, compressor preferences API 318 may prompt a user to select a dictionary to reuse from dictionary database 322 prior to compressing a web document.

In addition, compression preferences interface 1000 includes a second preferences selection of style set preferences 1008. Under style set preferences 1008, a user may select an option of internal to document 1010 and separate CSS stylesheet 1012. By selecting internal to document 1010, output controller 316 stores the compressed central style repository as a class element of a web document. By selecting separate CSS stylesheet 1012, output controller 316 stores the compressed central style repository in a separate CSS document and adds a reference to the CSS document to a referring web document.

Compression preferences interface 1000 includes a third preferences selection of compression type preferences 1014. Under compression type preferences 1014, a user may select an option of Lempel-Ziv (L-Z) compression 1016 or other types of compression 1018. The selected compression type preference specifies the compression algorithm for compression controller 312 to apply to a modified central style repository with class attributes referencing dictionary entries.

Figure 11:
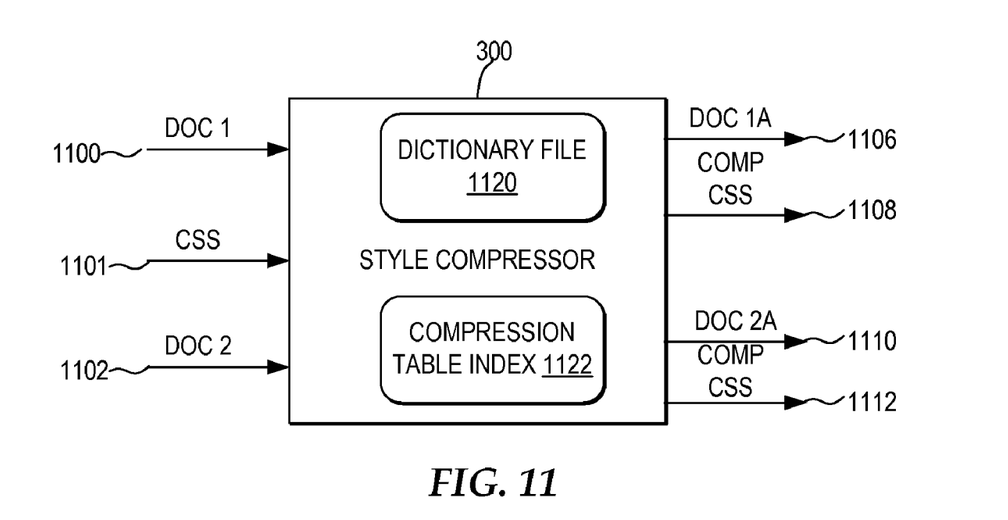
FIG. 11 is a block diagram depicting one example of a style compressor compressing the style attributes across multiple web documents.

With reference now to FIG. 11, a block diagram illustrates one example of a style compressor compressing the style attributes across multiple web documents. In addition to reorganizing and compressing the styles for a single web document, style compressor 300 may reorganize and compress multiple web documents to generate a single central style repository for sharing across the multiple web documents. By compressing web documents to share a single central style repository, a single CSS can be generated for all the pages of a web site.

In one example, a web service may enable a user may upload all the HTML documents and any CSS documents for a website and the web service then runs style compressor 300 to generate a single CSS document for application to all the HTML documents of the user's website. For example, a web host may include a service for compressing websites uploaded to the web hosting server. In another example, a web service may offer style compressor 300 for download to a user's local system for running at the local system to generate a single CSS document for application to all the HTML documents for a user's website.

In particular, in the example style compressor 300 receives web documents DOC1 1100, CSS 1101, and DOC2 1102. DOC1 1100 refers to styles in CSS 1101. DOC2 1102 includes styles assigned to elements within the body of the web document.

Compression controller 312 of style compressor 300 generates a single dictionary file 1120 with the style attributes from DOC1 1100, CSS 1101, and DOC2 1102. From dictionary file 320, compression controller 312 generates a single compression table index 1122. Then, from compression table index 1122, compression controller 312 generates a single compressed central style repository output in each of web documents compressed CSS 1108 and compressed CSS 1112. In addition, compression controller 312 updates DOC1 1100 to refer to compressed CSS 1108 and modifies DOC1 1100 to DOC1A 1106, where the elements of DOC1A 1106 reference class attributes, which in compressed CSS 1108 are assigned to one or more style attributes. Compression controller 312 also updates DOC2 1102 to refer to compressed CSS 1112 and modifies DOC2 1102 to DOC2A 1110, where the elements of DOC1A 1110 reference class attributes, which in compressed CSS 1112 are assigned to one or more style attributes.

In another example, a service provider that stores web documents for multiple subscribers, such as a blog or other personal website service provider, may automatically run style compressor 300 on multiple subscriber web documents to detect patterns and more style templates with subscriber preferred styles. In particular, as style compressor 300 collects style attributes into a central style repository list and then collects the central style repository lists for each web document into a dictionary file, style compressor 300 may keep a count of the number of redundant style attributes in each web document and keep a count of the number of redundant style attributes across the multiple web documents. From the counted redundant style attributes, a service provider may determine the style attributes most used and least used and design templates for customers based on the gathered information.

Referring now to FIG. 12, a high level logic flowchart depicts a processing and program for reorganizing and compressing the style attributes in at least one web document. In the example, the flowchart starts at block 1200 and thereafter proceeds to block 1202. Block 1202 depicts collecting style attributes from all document elements of a web document into a central style repository. Next, block 1204 illustrates replacing the element style attributes with class attribute references defined in the central style repository. Thereafter, block 1206 depicts reorganizing and compressing all style attributes in the central style repository by applying the Lempel-Ziv algorithm for compressing strings of style attributes into a minimized number of class attributes. Next, block 1208 illustrates updating each document element to reference the class attributes in the compressed central style repository. Thereafter, block 1210 depicts outputting the modified web document referencing or incorporating the compressed central style repository, and the process ends.

With reference now to FIG. 13, a high level logic flowchart illustrates a process and program for performing each of the phases of reorganization and compression of a web document. In the example, the flowchart starts at block 1300 and thereafter proceeds to block 1302.

In a first phase, block 1302 depicts collecting the element references to style attributes from a web document into a central style repository. Next, block 1304 depicts assigning each selection of style attributes to a class attribute. Thereafter, block 1306 illustrates replacing the style attributes referenced by each element with a corresponding class attribute assigned in the central style repository, and the process passes to block 1308.

In a second phase, block 1308 depicts collecting a dictionary file with an entry for each style attribute referenced in the central style repository. Next, block 1310 illustrates normalizing and sorting the dictionary list and assigning a key to each remaining entry. Thereafter, block 1312 depicts generating a modified central style repository by replacing each style attribute with a key pair from the dictionary file, and the process passes to block 1314.

In a third phase, block 1314 depicts running a data compression algorithm, such as the Lempel-Ziv algorithm, to compress the key sequences in the modified central style repository into a minimized number of class attributes each referencing one style attribute or a sequence of style attributes from among the key sequences. Next, block 1316 illustrates updating the elements of the web document to reference the class attributes of the compressed central style repository, and the process ends.

While the invention has been particularly shown and described with reference to a preferred embodiment, it will be understood by those skilled in the art that various changes in form and detail may be made therein without departing from the spirit and scope of the invention.

What is claimed is:

1. A method for improving compression of a web document, wherein the web document comprises a plurality of elements each referencing at least one style attribute, comprising:

collecting a plurality of style attributes referenced by the plurality of elements of the web document into a central style repository;

replacing each reference by each of the plurality of elements to a particular at least one of the plurality of style attributes with a separate class attribute assigned in the central style repository to the particular at least one of the plurality of style attributes;

compressing the plurality of style attributes in the central style repository into a minimized selection of class attributes each referencing at least one of the plurality of style attributes; and updating each of the plurality of elements of the web document to reference one or more of the minimized selection of class attributes, such that the web document is reorganized and compressed in length.

2. The method according to claim 1, wherein collecting a plurality of style attributes referenced by the plurality of elements of the web document into a central style repository, further comprises:

detecting a redundant selection of style attributes from among said plurality of style attributes referenced by a selection of elements from among said plurality of elements;

assigning a single class attribute to said particular redundant selection of style attributes;

detecting another redundant selection of style attributes from among said plurality of style attributes referenced by said selection of elements; and assigning another single class attribute to said another redundant selection of style attributes, wherein said single class attribute is different from the another single class attribute.

3. The method according to claim 1, wherein collecting a plurality of style attributes referenced by the plurality of elements of the web document into a central style repository further comprises:

editing the web document to generate a single style element in a head element of the web document for storing the central style repository.

4. The method according to claim 1, further comprising:

generating a dictionary file comprising a separate entry for each of the plurality of style attributes;

normalizing the plurality of entries to remove redundant entries;

alphabetizing the normalized remaining entries;

assigning a separate key to each of the normalized remaining entries; and replacing each of the plurality of style attributes in the central style repository with a corresponding separate key pair in the dictionary file, wherein the central style repository is enabled for compressing the plurality of sequences of keys to compress the plurality of style attributes in the central style repository into a minimized selection of class attributes each referencing at least one of the plurality of style attributes.

5. The method according to claim 1, wherein compressing the plurality of style attributes in the central style repository into a minimized selection of class attributes each referencing at least one of the plurality of style attributes further comprises:

replacing each reference to a particular style attribute within the central style repository with a same key assigned to the particular style attribute, wherein each of the plurality of types of style attributes is assigned a separate key from among a plurality of keys;

adding an entry for each of the plurality of keys to an index file;

scanning the central style repository to detect sequential pairs of keys and adding each sequential pair of keys to the index file;

scanning the central style repository to detect redundant sequences of keys longer in number than a sequential pair of keys and adding each redundant sequence of keys to the index file; and replacing the central style repository with the minimized number of class attributes representing only the compressed selection of entries from the index file required for matching all the keys in the central style repository, wherein each class attribute references at least one of the style attributes from among the plurality of style attributes.

6. The method according to claim 1, further comprising:

controlling output of the web document with the central style repository embedded in the web document.

7. The method according to claim 1, further comprising:

controlling output of the web document with a reference to a separate style web document comprising the central style repository.

8. The method according to claim 1, wherein compressing the plurality of style attributes in the central style repository into a minimized selection of class attributes each referencing at least one of the plurality of style attributes further comprises:

collecting a separate central style repository for each of a plurality of web documents into a combined central style repository;

compressing the plurality of style attributes in the combined style repository into a minimized selection of class attributes each referencing at least one of the plurality of style attributes.

9. A method for improving compression of a web document, wherein the web document comprises a plurality of elements each referencing at least one style attribute, comprising:

collecting a plurality of separate selections of style attributes each assigned to a separate element within a web document;

replacing each reference to a particular style attribute within the plurality of separate selections of style attributes with a same key assigned to the particular style attribute, wherein each of the plurality of types of style attributes is assigned a separate key from among a plurality of keys;

running a Lempel-Ziv algorithm to compress the sequences of keys representing the plurality of separate selections of style attributes into a minimized number of entries; and replacing each of the plurality of separate selections of style attributes each assigned to a separate element with a class attribute associated with one of the minimized number of entries referencing at least one of the style attributes.

10. A system for improving compression of a web document, wherein the web document comprises a plurality of elements each referencing at least one style attribute, comprising:

a style compressor executing on at least one computer system for receiving the web document;

the style compressor further comprising:

means for collecting a plurality of style attributes referenced by the plurality of elements of the web document into a central style repository;

means for replacing each reference by each of the plurality of elements to a particular at least one of the plurality of style attributes with a separate class attribute assigned in the central style repository to the particular at least one of the plurality of style attributes;

means for compressing the plurality of style attributes in the central style repository into a minimized selection of class attributes each referencing at least one of the plurality of style attributes; and means for updating each of the plurality of elements of the web document to reference one or more of the minimized selection of class attributes, such that the web document is reorganized and compressed in length.

11. The system according to claim 10, wherein the means for collecting a plurality of style attributes referenced by the plurality of elements of the web document into a central style repository, further comprises:

means for detecting a redundant selection of style attributes from among said plurality of style attributes referenced by a selection of elements from among said plurality of elements;

means for assigning a single class attribute to said particular redundant selection of style attributes;

means for detecting another redundant selection of style attributes from among said plurality of style attributes referenced by said selection of elements; and means for assigning another single class attribute to said another redundant selection of style attributes, wherein said single class attribute is different from the another single class attribute.

12. The system according to claim 10, wherein the means for collecting a plurality of style attributes referenced by the plurality of elements of the web document into a central style repository further comprises:

means for editing the web document to generate a single style element in a head element of the web document for storing the central style repository.

13. The system according to claim 10, the style compressor further comprising:

means for generating a dictionary file comprising a separate entry for each of the plurality of style attributes;

means for normalizing the plurality of entries to remove redundant entries;

means for alphabetizing the normalized remaining entries;

means for assigning a separate key to each of the normalized remaining entries; and means for replacing each of the plurality of style attributes in the central style repository with a corresponding separate key pair in the dictionary file, wherein the central style repository is enabled for compressing the plurality of sequences of keys to compress the plurality of style attributes in the central style repository into a minimized selection of class attributes each referencing at least one of the plurality of style attributes.

14. The system according to claim 10, wherein the means for compressing the plurality of style attributes in the central style repository into a minimized selection of class attributes each referencing at least one of the plurality of style attributes further comprises:

means for replacing each reference to a particular style attribute within the central style repository with a same key assigned to the particular style attribute, wherein each of the plurality of types of style attributes is assigned a separate key from among a plurality of keys;

means for adding an entry for each of the plurality of keys to an index file;

means for scanning the central style repository to detect sequential pairs of keys and adding each sequential pair of keys to the index file;

means for scanning the central style repository to detect redundant sequences of keys longer in number than a sequential pair of keys and adding each redundant sequence of keys to the index file; and means for replacing the central style repository with the minimized number of class attributes representing only the compressed selection of entries from the index file required for matching all the keys in the central style repository, wherein each class attribute references at least one of the style attributes from among the plurality of style attributes.

15. The system according to claim 10, the style compressor further comprising:

means for controlling output of the web document with the central style repository embedded in the web document.

16. The system according to claim 10, the style compressor further comprising:

means for controlling output of the web document with a reference to a separate style web document comprising the central style repository.

17. The system according to claim 10, wherein the means for compressing the plurality of style attributes in the central style repository into a minimized selection of class attributes each referencing at least one of the plurality of style attributes further comprises:

means for collecting a separate central style repository for each of a plurality of web documents into a combined central style repository;

means for compressing the plurality of style attributes in the combined style repository into a minimized selection of class attributes each referencing at least one of the plurality of style attributes.

18. The system according to claim 10, wherein the style compressor executes on a server system and initiates compression of the web document in response to the web document uploading to the server system.

19. The system according to claim 10, wherein the style compressor executes on a client system and initiates compression of the web document in response to a browser executing on the client system generating the web document as a dynamic web document.

20. The system according to claim 10, wherein the style compressor executes on a server system and initiates compression of the web document in response to the server system generating the web document as a dynamic web document to download to a client system.

* * * * *